(12) United States Patent
Mathy, Jr. et al.

(10) Patent No.: US 8,454,342 B2
(45) Date of Patent: Jun. 4, 2013

(54) MODULAR CLAMP STATION

(75) Inventors: John M. Mathy, Jr., Stewartstown, PA (US); Paul M. Oles, York, PA (US); David N. Fiorani, Jacobus, PA (US)

(73) Assignee: Graham Engineering Corporation, York, PA (US)

( * ) Notice: Subject to any disclaimer, the term of this patent is extended or adjusted under 35 U.S.C. 154(b) by 356 days.

(21) Appl. No.: 12/898,824

(22) Filed: Oct. 6, 2010

(65) Prior Publication Data
US 2012/0088007 A1   Apr. 12, 2012

(51) Int. Cl.
B29C 49/36 (2006.01)
B29C 49/56 (2006.01)

(52) U.S. Cl.
USPC ..... 425/193; 425/195; 425/451.4; 425/451.5; 425/540; 425/541

(58) Field of Classification Search
USPC ............... 425/192 R, 193, 195, 451.4, 451.5, 425/540, 541
See application file for complete search history.

(56) References Cited

U.S. PATENT DOCUMENTS

| | | | |
|---|---|---|---|
| 3,764,250 A | 10/1973 | Waterloo | |
| 4,421,472 A | 12/1983 | Martin, Jr. | |
| 4,801,260 A | 1/1989 | Oles et al. | |
| 5,681,596 A * | 10/1997 | Mills et al. | 425/532 |
| 5,705,121 A | 1/1998 | Allred, Jr. | |
| 6,113,841 A | 9/2000 | Nielsen | |
| 6,345,973 B1 | 2/2002 | Nielsen | |
| 6,709,261 B2 | 3/2004 | Cargile et al. | |
| 6,749,419 B2 | 6/2004 | Nightingale et al. | |
| 6,773,251 B2 * | 8/2004 | Nightingale | 425/182 |
| 7,611,657 B2 | 11/2009 | Klinedinst et al. | |
| 2010/0230868 A1 * | 9/2010 | Oles | 264/543 |
| 2012/0086156 A1 * | 4/2012 | Mathy et al. | 264/572 |
| 2012/0228790 A1 * | 9/2012 | Mathy et al. | 264/39 |
| 2012/0251653 A1 * | 10/2012 | Mathy et al. | 425/451 |

FOREIGN PATENT DOCUMENTS

| | | | |
|---|---|---|---|
| JP | 06278197 A | * | 10/1994 |
| JP | 2004299129 A | * | 10/2004 |
| WO | 2010105023 A2 | | 9/2010 |

OTHER PUBLICATIONS

PCT International Search Report, 25 pgs, Aug. 2012.

* cited by examiner

*Primary Examiner* — Robert B Davis
(74) *Attorney, Agent, or Firm* — McNees Wallace & Nurick LLC

(57) ABSTRACT

A modular mold clamp assembly for use in a molding machine. The assembly has a frame with a base member and oppositely-facing end members, with the oppositely-facing end members having mounting areas provided thereon. First and second platens are movably mounted on the base member between an open and a closed position. The platens are mounted on the frame and are movable relative to the frame without transmitting forces to the frame. The frame, containing the platens, can be mounted or unmounted to the molding machine by the use of mounting hardware cooperating with the mounting area of the frame.

20 Claims, 8 Drawing Sheets

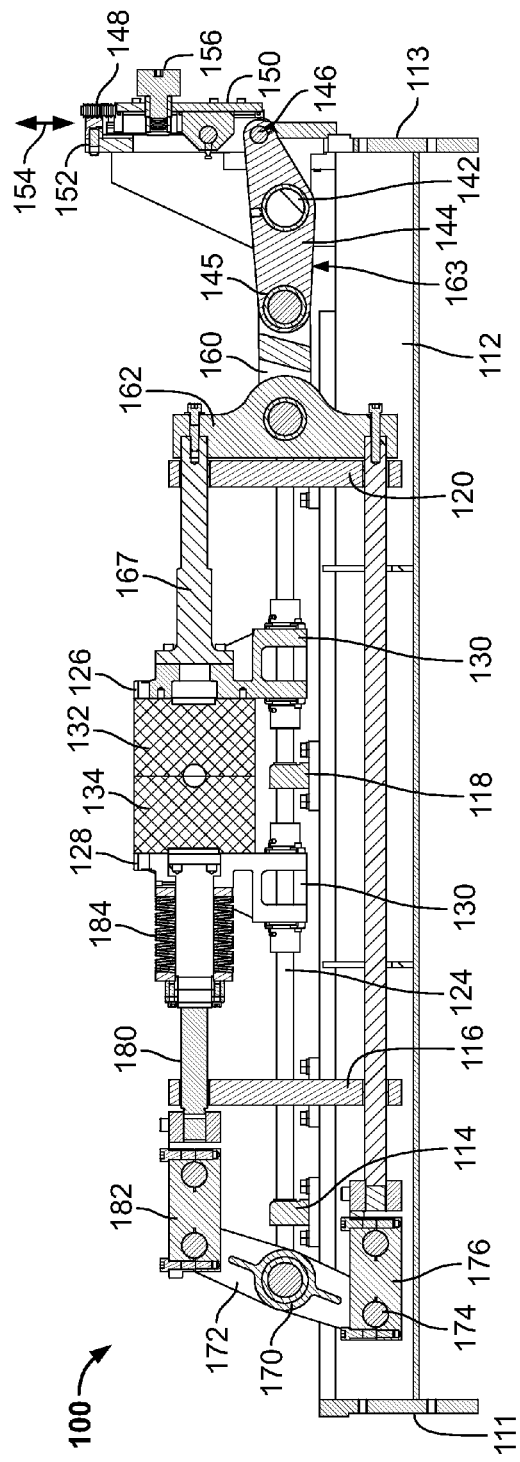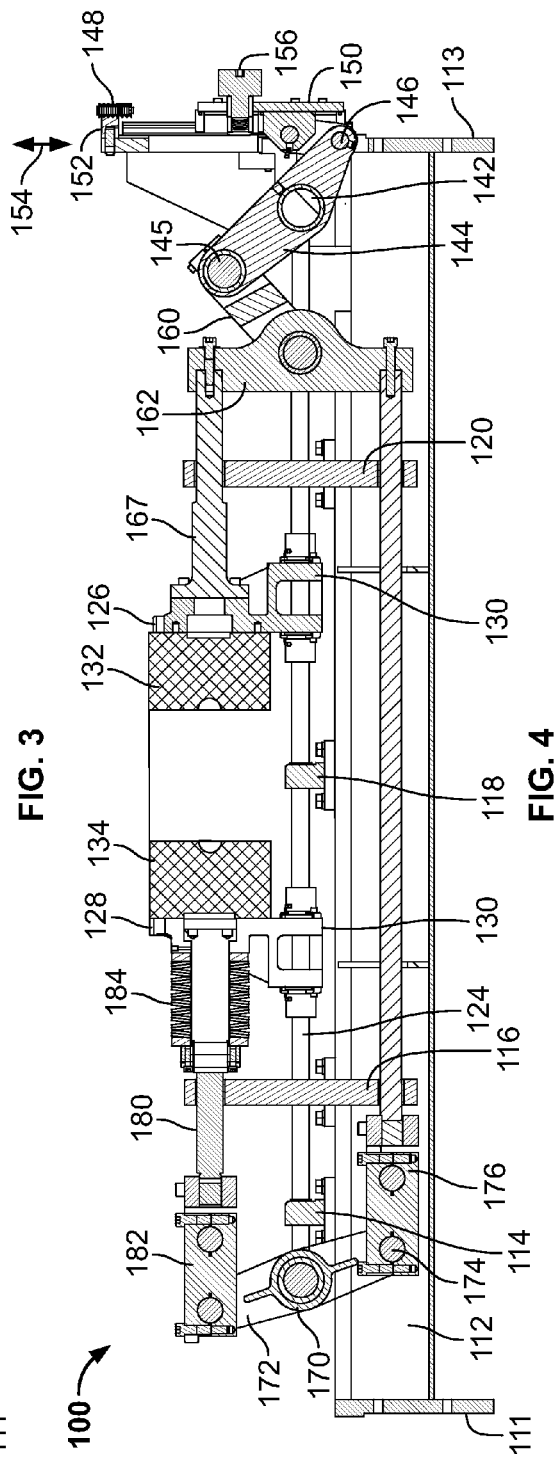

MODULAR CLAMP STATION

FIELD OF THE INVENTION

The invention relates generally to an extrusion molding apparatus. Specifically, the present invention relates to modular mold clamping assemblies for use with the molding apparatus.

BACKGROUND OF THE INVENTION

Conventional rotary extrusion blow molding apparatuses typically have a structural frame mounted on a rotating shaft. The structural frame has a plurality of molds mounted thereon and is known in the industry as a wheel. As the wheel is rotated, the plurality of molds is rotated past an extrusion die extruding a continuous parison. Each mold typically includes two mold halves, each comprising a mold cavity half therein, such that when the mold halves are closed, the mold defines a mold cavity corresponding to the configuration of the article to be molded, such as a container. Each mold, seriatim, is rotated past the extrusion die with the mold halves in an open configuration. The mold halves of each mold are then closed around the parison to enclose the parison within the mold defined by the mold halves. A blowing needle is then inserted into the parison within the closed mold and internal pressure is introduced to the parison, forcing it to inflate and conform to the configuration of the mold cavity. The molded object is then cooled and the mold opened to release the molded object from the mold.

When the two mold halves are clamped over one or more parisons prior to blowing of the parisons to form plastic containers, high clamp forces are required to close the mold halves on the parisons to pinch off the plastic and to hold the mold halves closed during blow molding. Conventional mold clamp assemblies are mounted on the frame of the machine supporting the assembly and, when actuated, transmit clamping force from a drive on one side of the mold to the other side of the mold through the frame. This means that the frame supporting the molds must be sufficiently strong to counteract bending moments imposed by the high clamp force transmitted through the frame. Deformation of the frame by the clamp force is undesirable because deformation would not permit the mold faces to close parallel with one another.

In an attempt to improve upon existing technology, U.S. Pat. No. 7,611,657 discloses a mold clamp assembly for a rotary-type or shuttle-type blow molding machine. The clamp assembly is mounted on a frame and includes a mold opening and closing drive connected to the two mold halves independently of the frame, so that when the mold halves are closed, clamp forces are not transmitted to the mold halves through the frame. Consequently, the high clamp force required to hold the mold halves together during blow molding is not transmitted from one side of the mold to the other side of the mold through the machine frame.

The blow molding apparatuses described above are typically costly, heavy machines, which require a good deal of expertise to maintain. For example, when a mold clamp requires maintenance, the entire wheel must be taken off-line as the mold clamp is worked on. In addition, if the number of mold clamps of the blow molding apparatus are to be changed to accommodate molds of a different size, the cost and time required to disassemble and reassemble the apparatus is significant.

Accordingly, there is a need for an improved molding apparatus and mold clamp assembly which allows for ease of maintenance and ease of configuration of the apparatus. There is also a need to reduce the complexity of the molding apparatus to help reduce the cost of the manufacture and operation of the molding apparatus. In addition, there is a need to have a modular mold clamp assembly for accomplishing the above, in which the high clamp force required to hold the mold halves together during molding is not transmitted from one side of the mold to the other side of the mold through the machine frame.

SUMMARY OF THE INVENTION

An object of the invention is to provide a self-contained modular mold clamp assembly which in uncomplicated to remove and replace with another modular mold clamp assembly with minimal downtime for the rotary molding wheel, thereby minimizing the impact to the productivity of the operation.

Another object of the invention is to provide a modular mold clamp assembly which can be replaced by maintenance level personnel rather than factory technicians, thereby minimizing the cost.

Another object of the invention is to provide a simplified structure of a rotary molding wheel by using a modular mold clamp assembly which provides the structural support necessary between components of the rotary molding wheel.

Another object of the invention is to provide a modular mold clamp assembly in which the bending moments are not transferred to the components of a rotary molding wheel.

Another object of the invention is to provide a modular mold clamp assembly which is lightweight.

Another object of the invention is to provide a modular mold clamp assembly which can be mounted to the rotary molding wheel in multiple configurations, allowing the rotary molding wheel to be configured to specific needs.

Another object of the invention is to provide modular mold clamping stations which can be used in tandem to accommodate large molds, to allow for even distribution of forces over the entire mold, and to prevent the end of the mold halves from separating when the parison is introduced into the mold cavity.

One aspect of the invention is directed to a modular mold clamp assembly for use in a molding machine. The assembly has a frame with a base member, a first end member and an oppositely-facing second end member, with the oppositely-facing first and second end members having mounting areas provided thereon. First and second platens are movably mounted on the base member between an open and a closed position. A drive linkage is mounted on the base member and cooperates with the first and second platens to move the platens between the open position and the closed position. A cam follower is slidably mounted on the first end member and is coupled to the drive linkage, whereby the movement of the cam follower moves the drive linkage. The platens, drive linkage and cam follower are mounted on the frame and are movable relative to the frame without transmitting forces to the frame. The frame, containing the platens, drive linkage and cam follower, can be mounted or unmounted to the molding machine by the use of mounting hardware cooperating with the mounting area of the frame.

Another aspect of the invention is directed to a rotary molding machine having a pair of turntables and a plurality of modular mold clamp assemblies. The pair of turntables are rotatably mounted on at least one shaft. The plurality of modular mold clamp assemblies are mounted on and spaced around the turntable. Each modular mold clamp assembly includes a frame having a base member, a first end member and an opposed second end member, with the first and second end members integrally attached to the base member. At least one mounting rod extends from the base member. First and second platens are movably mounted on the mounting rod to permit movement of the platens toward and away from each other. A mold clamp drive is provided for opening and closing the platens. The platens and mold clamp drive are mounted on the frame and are movable relative to the frame without transmitting forces to the frame. The frame, containing the mounting rods, platens, and mold clamp, can be mounted or unmounted to the turntables of the blow molding machine by the use of mounting hardware cooperating with the mounting area of the frame.

Another aspect of the invention is directed to a rotary molding machine for use with mold halves that are large and require increased clamping force. The rotary molding machine has a pair of turntables rotatably mounted on a shaft or shafts. The turntables have a plurality of modular mold clamp assembly mounting stations. A tandem of modular mold clamp assemblies are mounted in at least one mounting station. A first of the tandem of modular mold clamp assemblies cooperates with a first end of first and second mold halves to apply sufficient force to maintain the first end of the first and second mold halves in the closed position. A second of the tandem of modular mold clamp assemblies cooperates with a second end of the first and the second mold halves to apply sufficient force to maintain the second end of the first and second mold halves in the closed position. The combination of the tandem of modular mold clamp assemblies properly distributes forces to the mold halves to maintain the mold halves in a closed position as required.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a cross-sectional view of the modular mold clamp assembly of FIG. 1, taken along the longitudinal axis of the modular mold clamp assembly.

FIG. 4 is a cross-sectional view of the modular mold clamp assembly of FIG. 2, taken along the longitudinal axis of the modular mold clamp assembly.

DETAILED DESCRIPTION OF THE INVENTION

Figure 9:
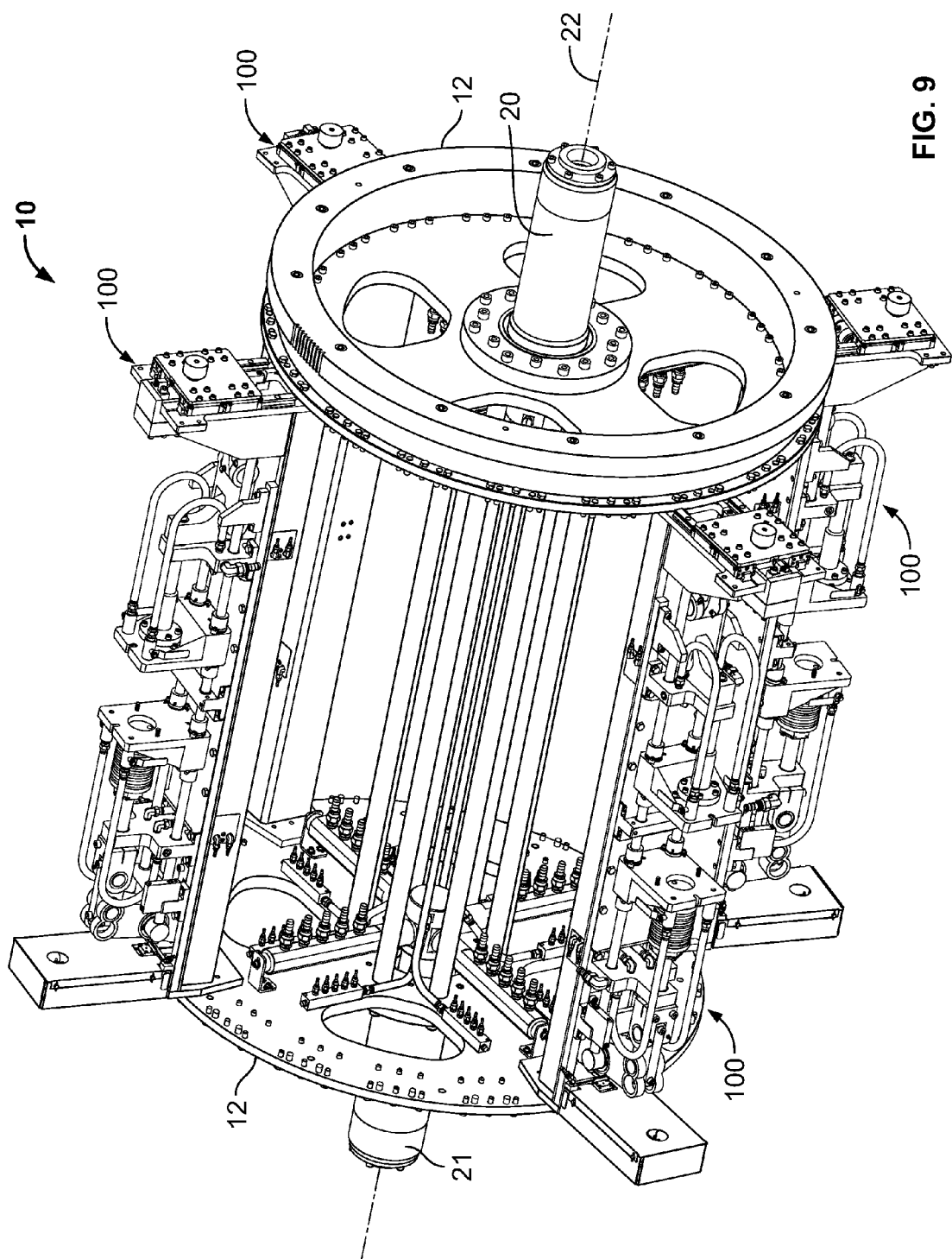
FIG. 9 is a perspective view of a wheel of a blow molding apparatus with several modular mold clamp assemblies attached thereto, the mold clamp assemblies being shown with no molds positioned therein.
Figure 10:
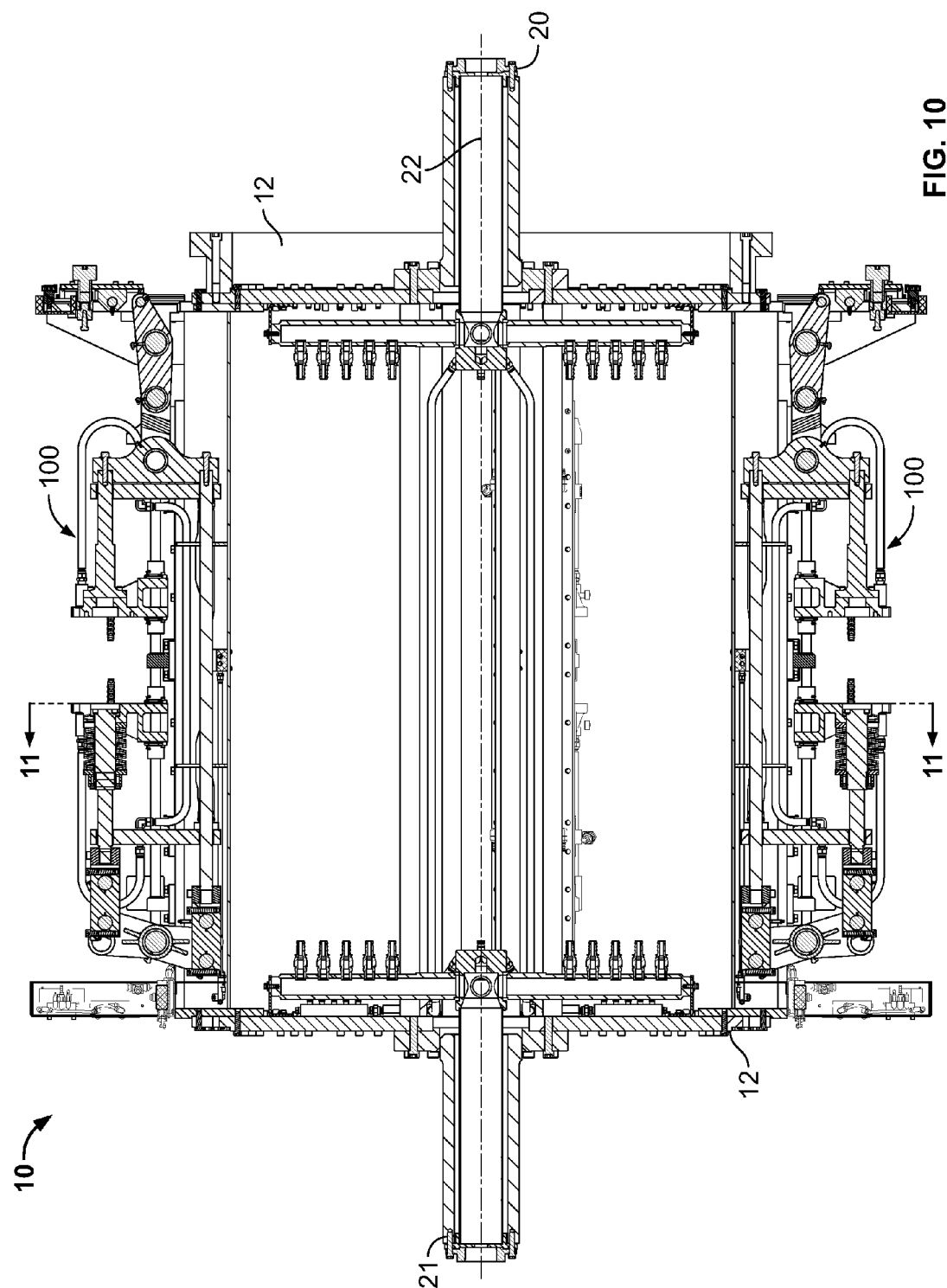
FIG. 10 is a cross-sectional view of the wheel, taken along the plane of the longitudinal axis of the wheel.
Figure 11:
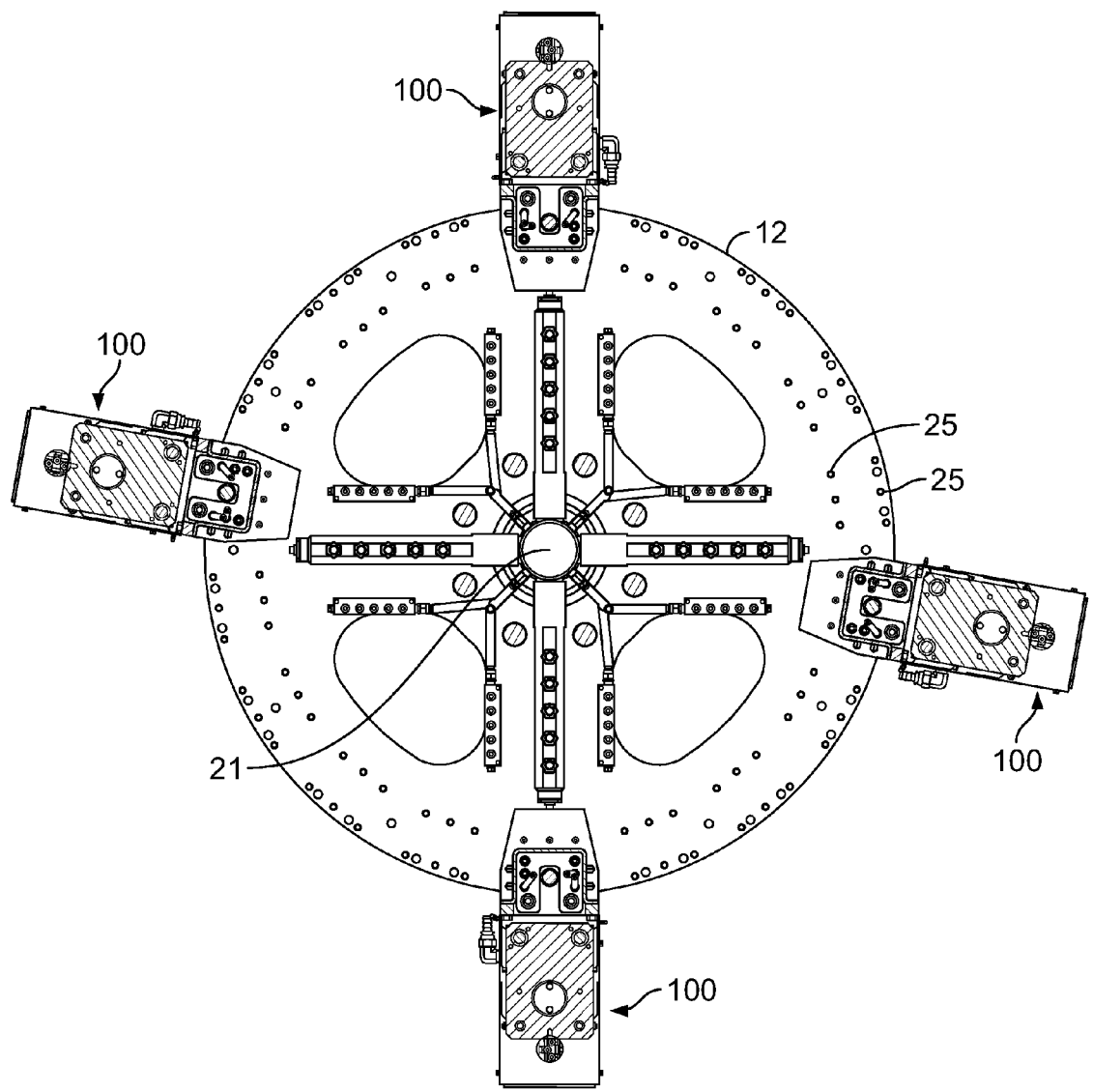
FIG. 11 is a cross-sectional view of the wheel, taken along the line 11-11 of FIG. 9.

Referring to FIGS. 9-11, a wheel 10 of a blow molding machine is illustrated. However, the invention is not limited to a blow molding machine, as other molding machines can be used without departing from the scope of the invention. The blow molding machine has a base (not shown) upon which the wheel 10 is rotatably supported. An extruder (not shown) is positioned adjacent the wheel 10. The wheel 10 has two essentially parallel radially extending plates or turntables 12 which carry a plurality of modular mold clamp assemblies 100, each having an inner cavity (not depicted) to receive a parison from the extruder. The wheel 10 is mounted on a shafts 20, 21 which has a drive which rotates the wheel 10 and modular mold clamp assemblies 100 about a rotational axis 22 of the wheel 10 and the shafts 20, 21 to direct each mold secured by the modular mold clamp assemblies 100 between extrusion, blow molding, cooling and ejection stations, as is known in the art. In the depicted embodiment, the wheel 10 is configured to have eighteen modular mold clamp assemblies mounted thereon, of which four are shown. However, each wheel 10 can be configured to allow any number of modular mold clamp assemblies 100 to be secured thereto.

Referring to FIGS. 1-8, an exemplary embodiment of mold clamp assembly 100 is shown, the modular mold clamp assembly 100 having a frame 110. The frame 110 has a base member 112 and two oppositely-facing end members 111, 113. The end members 111, 113 extend from either end of the base member 112 in a direction that is essentially transverse to the longitudinal axis of the base member 112. The end members 111, 113 are integrally attached to the base member in any known manner which has the strength characteristics required. Mounting openings 115 are provided on the frame 110 proximate the ends of the base member 112. The openings 115 cooperate with mounting hardware to mount the modular mold clamp assembly 100 to mounting openings 25 of the turntables 12 of the wheel 10. The base member 112 and end members 111, 113 are made from any material that has the strength characteristics required to support the components of the modular mold clamp assembly 100 and to provide the structural integrity required to support the radially extending turntables 12 of the wheel 10.

Figure 1:
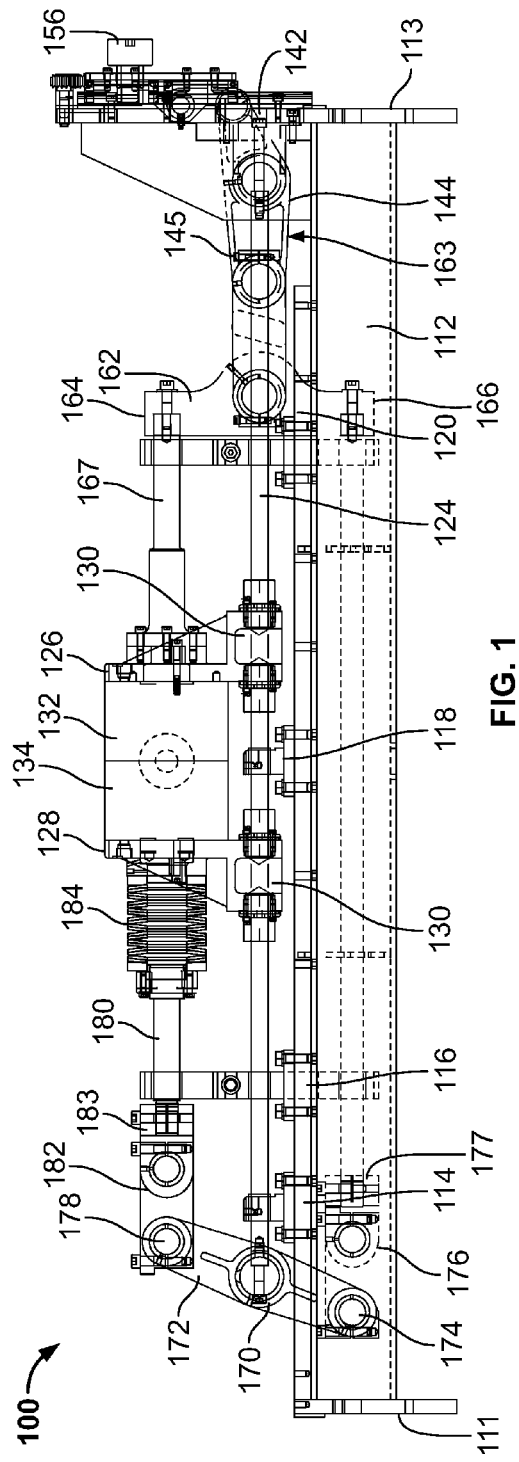
FIG. 1 is a side view of a first embodiment of a modular mold clamp assembly for a rotary-type blow molding machine, the modular mold clamp assembly having molds inserted therein and being shown in the closed position.

Each modular mold clamp assembly 100 includes rods 124 mounted on base member 112 of frame 110. The rods 124 extend essentially parallel to the longitudinal axis of the base member 112. As best shown in FIGS. 1 and 4, rods 124 extend through openings in mounting brackets 114, 116, 118, 120. In the embodiment shown, the mounting brackets 114, 116, 118, 120 are fixed to the base member 112 by bolts or other mounting hardware. Mold platens 126 and 128 are mounted on the rods 124 by slides 130 which permit movement of the platens toward and away from each other during closing and opening of mold halves 132 and 134 mounted on platens 126 and 128 respectively. FIG. 1 illustrates assembly 100 with the mold halves closed.

Pin 142 extends through a portion of end member 113. The adjacent ends of rods 124 are secured to the pin. Pivot arm 144 is rotatably mounted on pin 142 between the rods 124. The outer end 146 of arm 144 away from the mold halves extends through an opening in end member 113 and is connected to slide car 148 by links 150. The slide car 148 is mounted on the outside surface of the end wall 113 by slide 152 to permit movement of the car back and forth in the direction of arrow 154 shown in FIGS. 3 and 4. Car 148 carries cam follower roller 156, which extends into circumferential fixed cam slot (not shown) of the blow molding machine. Rotation of wheel 10 moves follower 156 into and around the cam slot to slide car 148 inwardly and outwardly and rotate arm 144 between the positions shown in FIGS. 1 and 2.

Shift member 162 is located between mold platen 126 and end member 113. A cylindrical rod 167 extends from an upper end 164 of member 162 and is bolted directly to mold platen 126 so that movement of member 162 toward end member 113 moves the mold platen 126 and mold half 132 toward the end member 113. The lower end 166 of shift member 162 extends from the lower end of bracket 120 and extends below mold halves 132 and 134. The shift member is slidably mounted on rods 124 and 168.

Link 160 is pivotally connected to the inner link end 145 of arm 144 and to mold shift member 162. The pivot connection between link 160 and member 162 is located halfway between the upper end 164 and lower end 166 of member 162 to balance forces. Shift rod 168 is parallel to the longitudinal axis of the base member 112 and extends freely through the base member 112. The shift rod 168 is connected to the lower end 166 of member 162. The link 160 and inner link end 145 of arm 144 form a two-link extendable and retractable drive 163 for opening and closing platens 126, 128 and mold halves 132, 134.

Cross pin 170 is fixedly mounted on the ends of rods 124 extending past platen 128 and mold half 134 and rotatably supports pivot arm 172. The lower end 174 of arm 172 is connected to the adjacent end of shift rod 168 by pivot link 176 and rod end clevis 177. The upper end 178 of arm 172 is connected to mold clamp rod 180 by pivot link 182 and rod end clevis 183. Clamp rod 180 is connected to platen 128 through dished washer spring pack 184. Rod 168, clevis 177, link 176, arm 172 and rod 180 are part of a mold shift mechanism for opening and closing platen 128 and mold half 134. Mold shift mechanism is connected to drive 163 through member 162.

In operation, the modular mold clamp assemblies 100 are assembled to the turntable 12 of the wheel 10, as previously described. Water management hoses are attached to a water-connection member of each assembly 100. The water is supplied to cool the mold, as is known in the industry. Air hoses are attached to an air-connection member of each assembly 100. The air is used to blow air into the mold cavities and to operate the required devices to facilitate the removal of the container from the cavity, both of which are known in the industry.

Figure 2:
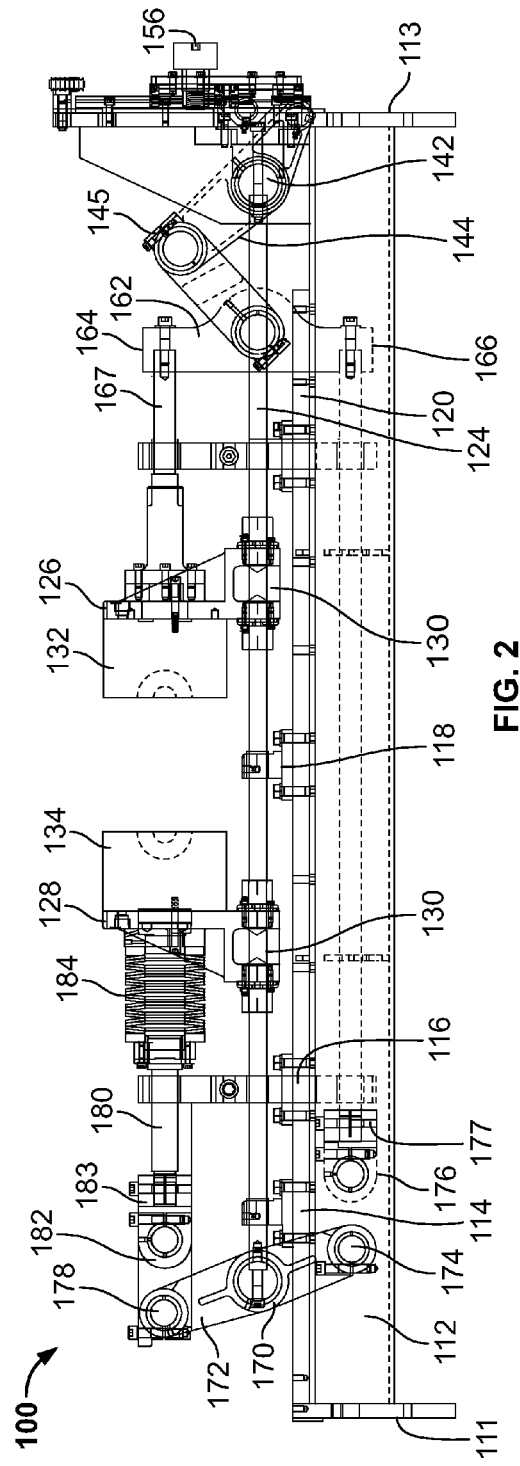
FIG. 2 is a side view of a first embodiment of the modular mold clamp assembly for a rotary-type blow molding machine, the modular mold clamp assembly having molds inserted therein and being shown in the open position.
Figure 5:
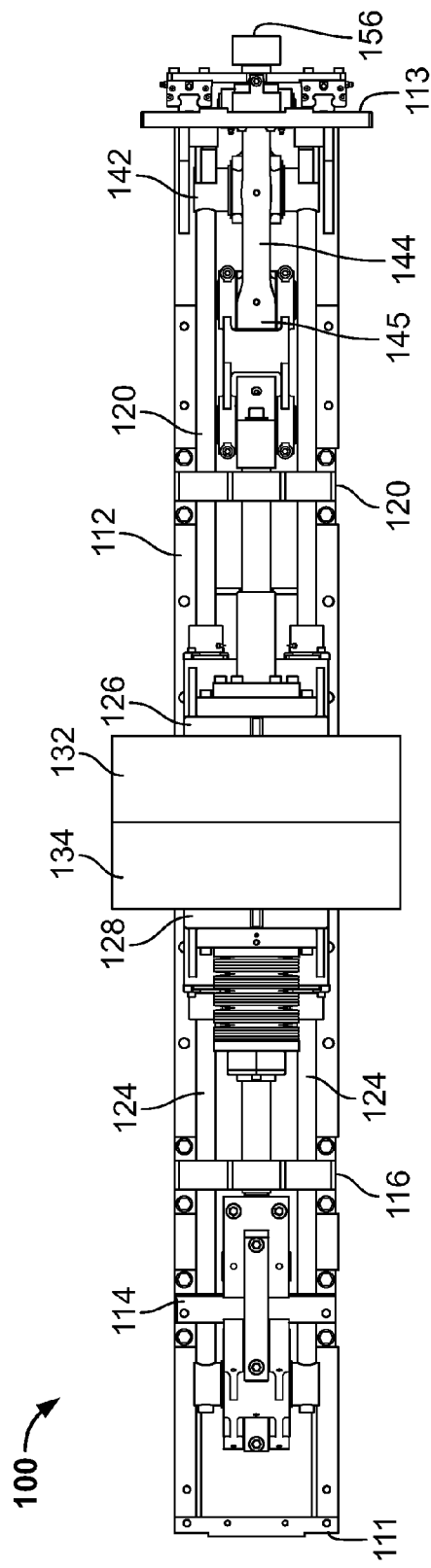
FIG. 5 is a top view of the modular mold clamp assembly of FIG. 1.
Figure 6:
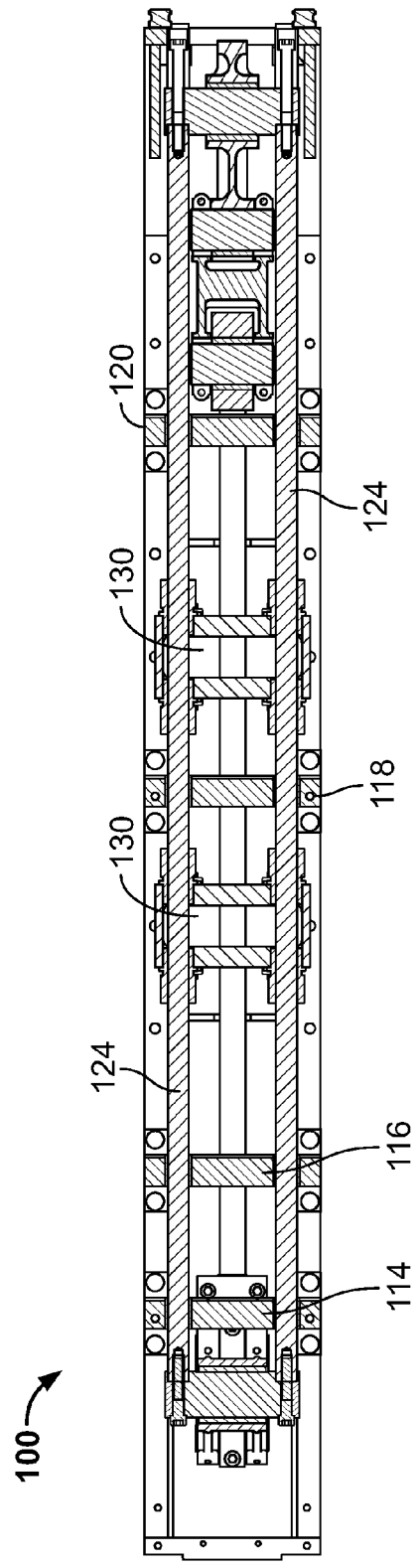
FIG. 6 is a cross-sectional view through a tie rod centerline of the modular mold clamp assembly of FIG. 1.
Figure 8:
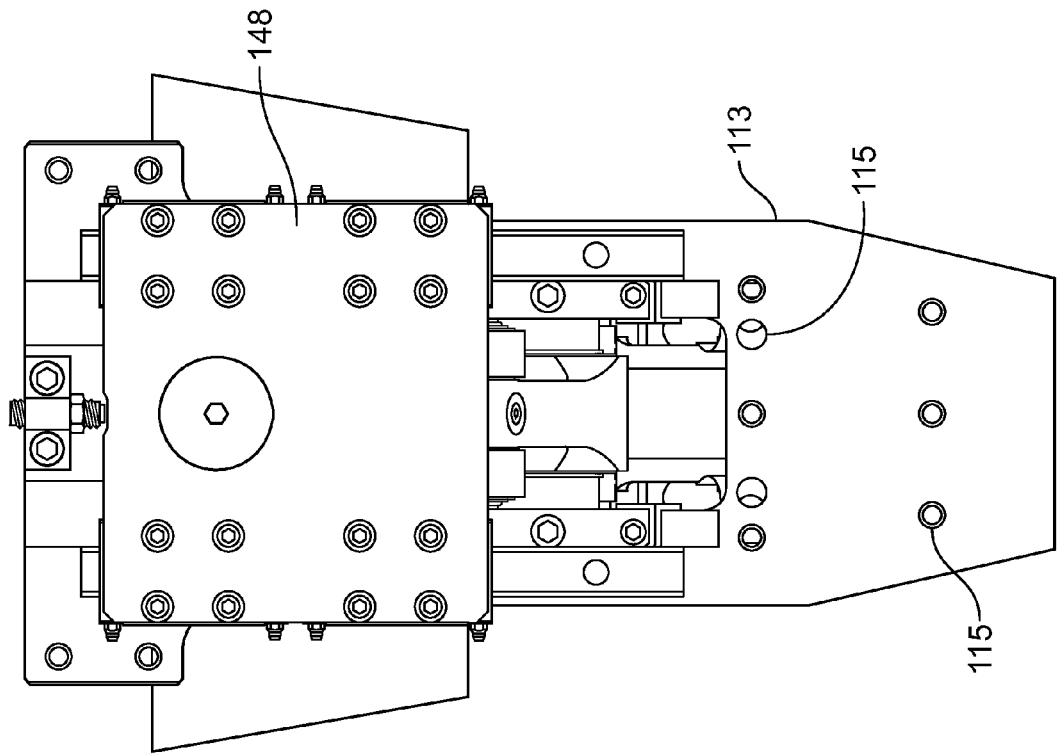
FIG. 8 is a second end view of the modular mold clamp assembly of FIG. 1.
Figure 7:
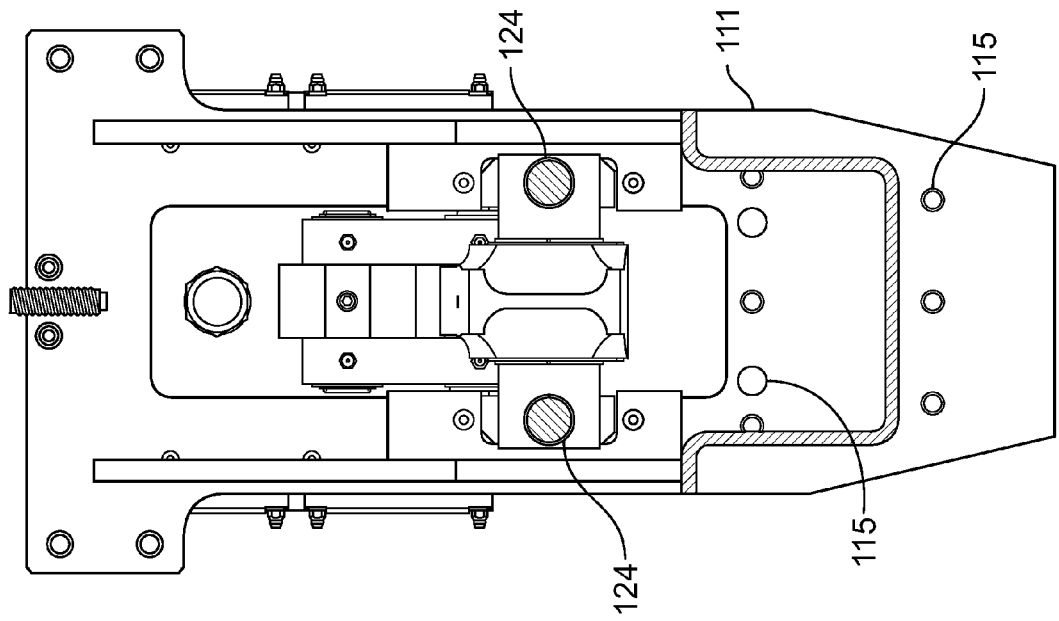
FIG. 7 is a first end view of the modular mold clamp assembly of FIG. 1.

With the mold halves 132 and 134 in the open position and drive 163 retracted as shown in FIG. 2, rotation of wheel 10 moves the open mold halves 132, 134 past the extrusion station to either side of a number of parisons extruded from an extrusion head. Rotation of the wheel 10 also moves follower 156 along a radially outward portion of a cam slot to slide car 148 radially outwardly from the position of FIG. 2 to the position of FIG. 1. This movement rotates arm 144 counterclockwise from the position of FIG. 2 to the position of FIG. 1.

Rotation of arm 144 from the position of FIG. 2 to the position of FIG. 1 extends drive 163 to move shift member 162 away from end member 113. Movement of the shift member moves mold half 132 from the open position to the closed position. Movement of the shift member also actuates mold shift mechanism to move shift rod 168 away from end member 113, rotate arm 172 and move mold half 134 from the open position to the closed position. The connection between rod 180 and spring pack 184 is adjusted so that spring pack 184 is compressed when the mold is closed.

During and after closing of the mold, the clamp force exerted on mold half 134 is transmitted directly to drive 163 through mold shift mechanism. An equal and oppositely-directed clamp force exerted on mold half 132 is transmitted to the drive directly through member 162. Clamping forces are transmitted through rods 124 between cross pins 170 and fixed pin 142 which in turn is attached to end frame 113. Clamping forces are not transmitted through frame member 110. The end of the mold shift mechanism, cross pin 170, adjacent end member 111 floats on the frame 110. As a result, the frame 110 is not subjected to bending moments by the high clamp forces holding mold halves 132 and 134 closed. The frame 110 need not be strengthened against bending moments. Smaller, more efficient motors may be used to operate the machine due to weight reduction.

After closing of the mold to capture the parison, rotation of wheel 10 moves the closed mold halves away from the extrusion station to a blow station where the parisons are blown, and, after cooling of the blown parisons, to an ejection station where the mold is opened for ejection of blow-molded containers. During rotation to the ejection station, follower 156 is moved radially inwardly by the cam track so that arm end 146 is moved radially inwardly, about fixed pin 142, drive 163 is retracted as shown in FIG. 2, and the platens 126, 128 and mold halves 132, 134 are opened by movement of the shift member 162 and mold shift mechanism. Platen 126 and mold half 132 are connected directly to shift member 162 and are opened in response to movement of the member. Platen 128 and mold half 134 are opened by movement of shift rod 168 toward side member 113, which corresponds to rotation of arm 172 and movement of rod 180 away from side member 113 and toward side member 111.

During the operation of the wheel 10, it is not uncommon to have problems with a particular mold clamp assembly. It is also common to have scheduled maintenance. In the current state of the art, in order to repair or perform maintenance on a particular mold clamp assembly, the operation of the wheel is stopped and the repair or maintenance is performed on the mold clamp assembly as the assembly is still attached to the wheel. This can cause significant downtime for the entire operation and dramatically affects the productivity of the operation. Alternatively, the operation of the wheel is stopped and the mold clamp assembly is removed from the plates and shafts of the wheel and replaced with another mold clamp assembly. However, as the mold clamp assemblies are attached at numerous points to the structure of the wheel, this process takes a good deal of time and expertise to accomplish, thereby dramatically affecting the productivity of the operation and requiring the services of a skilled operator to accomplish the transfer.

In contrast, the modular mold clamp assembly 100 described herein overcomes the problems associated with the prior art. As all of the components of the modular mold clamp assembly 100 are mounted to the frame 110, the removal of the self-contained modular mold clamp assembly 100 from the wheel 10 is greatly facilitated. In order to repair or perform maintenance on a particular mold clamp assembly 100, the operation of the wheel 10 is stopped and the modular mold clamp assembly 100 is removed and replaced with another modular mold clamp assembly 100. As all of the components are attached to the frame 100, rather than to structural members of the wheel 10, the maintenance personnel simply unscrews the hardware which attaches the frame 110 of the modular mold clamp assembly 100 to the wheel 10, removes the modular mold clamp assembly 100, inserts a new modular mold clamp assembly 100 and attaches the frame 110 to the wheel 10 by use of the hardware. This allows the repair or maintenance to be accomplished with minimal downtime for the wheel, thereby minimizing the impact to the productivity of the operation. Additionally, the replacement of the modular mold clamp assembly 100 can be accomplished with maintenance level personnel rather than factory technicians, thereby minimizing the cost.

The use of the modular mold clamp assemblies 100 also allows the structure of the wheel 10 to be simplified. As each modular member assembly 100 is self-contained, the various components of the modular mold clamp assembly 100 are not mounted to shafts or plates which extend between the turntables 12 of the wheel 10. In addition, the base member 112 and the end members 111, 113 are made of materials that have the structural strength and integrity to act as supports when installed in the wheel 10. Therefore, the wheel 10 used with the modular mold clamp assemblies 100 described herein is greatly simplified from the wheels currently in use. The shafts and plates previously required are eliminated, as the modular mold clamp assemblies 100 provide the structural support necessary between the turntables 12 of the wheel 10. This allows the wheel 10 of the blow molding machine to have more open spaces, making any repair to the blow molding machine easier. The use of the modular mold clamp assemblies 100 as supports also reduces the overall cost of the blow molding machine, as it is less expensive to have structural modular mold clamp assemblies than to have structural shafts and plates.

While the base member 112 and end members 111, 113 must be made of material which has sufficient strength characteristics to support the components and provide the structural integrity required for the wheel 10, the frame 110 does not need to made of material which can withstand the bending moments exerted by the high clamp forces holding molds 132 and 134 closed, as the bending moments are not transferred to the frame 110, as was previously described. Therefore, the frame 110 need not be strengthened against bending moments, thereby allowing the frame 110 to be made of relatively lightweight material. This facilitates the removal and replacement of the modular mold clamp assembly 100 and reduces the material costs to manufacture the frame 110.

Depending upon the type of container to be manufactured using the blow molding machine, the number of molding stations may vary. Consequently, it is known in the art to have wheels with different numbers of mold stations. Currently, each of the wheels must be manufactured according to the desired application, with the appropriate number of shafts extending between the turntables to provide support to the turntables and to provide the mounting structure for the mold clamp assemblies. Consequently, as each wheel is designed for a particular number of mold stations, the inventory associated with meeting the needs of applications can be extensive.

According to the invention described herein, the inventory required to accommodate various configurations is minimized. As the wheels do not require shafts, etc., the wheels can be manufactured to accommodate different configurations. An array of mounting openings 25 may be provided on the turntables 12 of the wheels 10. The mounting openings 25 can be configured to accommodate multiple mold clamp assembly configurations. The modular mold clamp assemblies 100 may be used to accommodate various configurations of the wheel. The end members 111, 113 are positioned in line with the appropriate openings 25 of the turntables 12 of the wheel 10 and mounted thereto using the mounting hardware. This allows the same modular mold clamp assemblies 100 to be used in various machines, thereby reducing the need to manufacture specific mold clamp assemblies for specific machines.

While the particular embodiment shown represents a two-ton modular clamp assembly, other sizes of modular clamp assemblies are included within the scope of the invention.

In instances in which a large mold is required for manufacture of a container or the like, a single two-ton clamp may not be sufficient to provide the force required to maintain the mold halves in their closed position. Currently in such cases, a larger mold clamp may be used to supply the appropriate force. This requires that mold clamps of various sizes be manufactured. While these larger mold clamps supply sufficient force, the distribution of forces by the clamps on the mold is not optimum. The clamps generally cooperate with the center of the molds, exerting maximum force thereon. Therefore, the ends of the molds may not have a sufficient force applied thereto, causing the parison to flow outside of the mold cavity, which in turn can cause an undesirable container to be produced.

Figure 12:
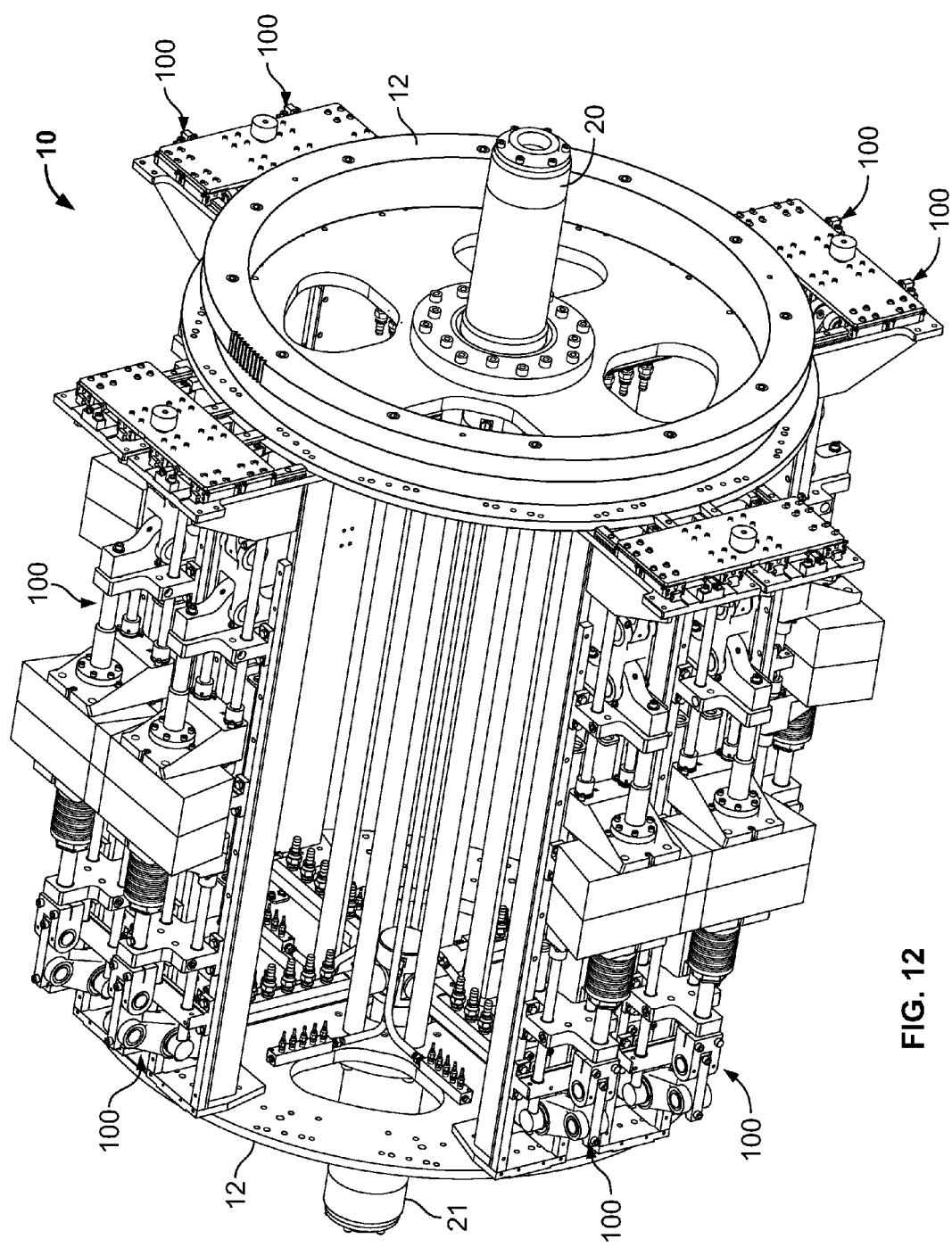
FIG. 12 is a perspective view of a wheel of a blow molding apparatus with several modular mold clamp assemblies attached in tandem thereto, the mold clamp assemblies being shown with molds positioned therein.

In contrast, according to the present invention, two modular mold clamp assemblies 100 may be provided adjacent each other in tandem or in line, as shown in FIG. 12, to accommodate large mold halves. In this embodiment, the two modular mold clamp assemblies 100' and 100" are mounted to the turntables 12 of the wheel 10 such that the base members 112', 112" are essentially parallel to each other and the platens 126', 126" and 128', 128" operate in the same plane. In so doing, mold half 132 cooperates with platens 126' and 126", while mold half 134 cooperates with platens 128' and 128". This allows platen 126' to cooperate with a first end of mold half 132 and platen 126" to cooperate with second end of mold half 132. Similarly, platen 128' cooperates with a first end of mold half 134 and platen 128" cooperates with second end of mold half 134. The cooperation of the modular mold clamp assemblies 100 allows sufficient closing force to be applied to a large mold without the need to have a larger, more costly mold clamp assembly. In addition, this configuration allows for the forces applied to the mold halves by the platens 126', 126", 128' and 128" to be more evenly distributed over the entire mold halves, preventing the ends of the mold halves from separating when the parison is introduced into the mold cavity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A modular mold clamp assembly for use in a molding machine, the assembly comprising:
   a frame having a base member, a first end member and an oppositely-facing second end member, the oppositely-facing first and second end members having mounting areas provided thereon;
   first and second platens movably mounted on the base member, the platens being movable between an open and a closed position;

a drive linkage mounted on the base member, the drive linkage cooperating with the first and second platens to move the platens between the open position and the closed position;

a cam follower slidably mounted on the first end member, the cam follower coupled to the drive linkage, whereby the movement of the cam follower moves the drive linkage;

the platens, drive linkage and cam follower being mounted on the frame and being movable relative to the frame without transmitting forces to the frame, whereby the frame, containing the platens, drive linkage and cam follower, can be mounted or unmounted to the molding machine by the use of mounting hardware cooperating with the mounting area of the frame.

2. The modular mold clamp assembly as recited in claim 1, wherein a pair of mounting rods extend through openings in mounting brackets, the mounting brackets being mounted to the base member of the frame.

3. The modular mold clamp assembly as recited in claim 2, wherein the mounting rods are secured to a pin which extends through the first end member.

4. The modular mold clamp assembly as recited in claim 1, wherein a shift member is located between the first platen and the first end member, the shift rod extending from a lower end of the shift member, the lower end of the shift member and the shift rod being positioned by a first mounting bracket that is fixed to the base member of the frame.

5. The modular mold clamp assembly as recited in claim 4, wherein a pivot arm is located between the second platen and the second end member, the shift rod extending from a lower end of the pivot arm, the pivot arm being positioned by a second mounting bracket that is fixed to the base member of the frame.

6. The modular mold clamp assembly as recited in claim 1, wherein the modular clamp assembly is mounted on the molding machine adjacent to a second modular clamp assembly, whereby the two modular mold clamp assemblies are provided in tandem to accommodate large mold halves.

7. The modular mold clamp assembly as recited in claim 6, wherein the first and second modular mold clamp assemblies are mounted to the molding machine such that the base members of the first and second modular mold clamp assemblies are parallel to each other and the respective first and second platens operate in the same plane, whereby the first and second platens of the first modular mold clamp assembly cooperate with a first end of a mold inserted between the platens, and the first and second platens of the second modular mold clamp assembly cooperate with a second end of the mold.

8. A rotary molding machine comprising;
a pair of turntables rotatably mounted on a shaft;
a plurality of modular mold clamp assemblies mounted on and spaced around the turntable, each modular mold clamp assembly including a frame having a base member, a first end member and an opposed second end member, the first and second end members integrally attached to the base member, at least one mounting rod extending from the base member, first and second platens movably mounted on the mounting rod to permit movement of the platens toward and away from each other, and a mold clamp drive for opening and closing the platens;
the platens and mold clamp drive being mounted on the frame and being movable relative to the frame without transmitting forces to the frame, whereby the frame, containing the mounting rods, platens, and mold clamp, can be mounted or unmounted to the turntables of the molding machine by the use of mounting hardware cooperating with the mounting area of the frame.

9. The rotary molding machine as recited in claim 8, wherein a first modular clamp assembly is mounted on the turntables of the molding machine adjacent to a second modular clamp assembly, whereby the two modular mold clamp assemblies are provided in tandem to accommodate large mold halves.

10. The rotary molding machine as recited in claim 9, wherein the first and second modular mold clamp assemblies are mounted on the turntables of the molding machine such that the base members of the first and second modular mold clamp assemblies are parallel to each other and the respective first and second platens operate in the same plane, whereby the first and second platens of the first modular mold clamp assembly cooperate with a first end of a mold inserted between the platens, and the first and second platens of the second modular mold clamp assembly cooperate with a second end of the mold.

11. The rotary molding machine as recited in claim 8, wherein a pair of mounting rods extend through openings in mounting brackets of each modular mold clamp assembly, the mounting brackets being mounted to the base member of the frame of each modular mold clamp assembly.

12. The rotary molding machine as recited in claim 11, wherein the mounting rods of each modular mold clamp assembly are secured to a pin which extends through the first end member.

13. The rotary molding machine as recited in claim 8, wherein a shift member is located between the first platen and the first end member of each modular mold clamp assembly, the shift rod extending from a lower end of the shift member, the lower end of the shift member and the shift rod being positioned by a first mounting bracket that is fixed to the base member of the frame of each modular mold clamp assembly.

14. The rotary molding machine as recited in claim 8, wherein a shift rod is positioned in the base of each modular mold clamp assembly, the shift rod indirectly connected to the first and second platens, the shift rod being positioned by a second mounting bracket that is fixed to the base member of the frame of each modular mold clamp assembly.

15. A rotary molding machine for use with mold halves that are large and require increased clamping force, the rotary molding machine comprising;
a pair of turntables rotatably mounted on a shaft;
a plurality of modular mold clamp assembly mounting stations;
a tandem of modular mold clamp assemblies mounted in at least one mounting station, a first of the tandem of modular mold clamp assemblies cooperating with a first end of first and second mold halves to apply sufficient force to maintain the first end of the first and second mold halves in the closed position, a second of the tandem of modular mold clamp assemblies cooperating with a second end of the first and the second mold halves to apply sufficient force to maintain the second end of the first and second mold halves in the closed position, the combination of the tandem of modular mold clamp assemblies properly distributing forces to the mold halves to maintain the mold halves in a closed position as required.

16. The rotary molding machine as recited in claim 15, wherein each modular mold clamp assembly has a frame having a base member, a first end member and an oppositely-facing second end member, the oppositely-facing first and second end members having mounting areas provided thereon, first and second platens being movably mounted on the base member, the platens being movable between an open and a closed position.

17. The rotary molding machine as recited in claim 16, wherein the first and second modular mold clamp assemblies are mounted on the turntables of the molding machine such that the base members of the first and second modular mold clamp assemblies are parallel to each other and the respective first and second platens operate in the same plane, whereby the first and second platens of the first modular mold clamp assembly cooperate with a first end of a mold inserted between the platens and the first and second platens of the second modular mold clamp assembly cooperate with a second end of the mold.

18. The rotary molding machine as recited in claim 16, wherein a pair of mounting rods extend through openings in mounting brackets of each modular mold clamp assembly, the mounting brackets being mounted to the base member of the frame of each modular mold clamp assembly.

19. The rotary molding machine as recited in claim 18, wherein the mounting rods of each modular mold clamp assembly are secured to a pin which extends through the first end member.

20. The rotary molding machine as recited in claim 16, wherein a shift member is located between the first platen and the first end member of each modular mold clamp assembly, the shift rod extending from a lower end of the shift member, the lower end of the shift member and the shift rod being positioned by a mounting bracket that is fixed to the base member of the frame of each modular mold clamp assembly.

\* \* \* \* \*